US011148636B2

(12) United States Patent
Thomas et al.

(10) Patent No.: US 11,148,636 B2
(45) Date of Patent: Oct. 19, 2021

(54) TIME BASED SEATBELT ROUTING DETECTION VIA IN-CABIN SENSORS

(71) Applicant: GM GLOBAL TECHNOLOGY OPERATIONS LLC, Detroit, MI (US)

(72) Inventors: Scott D. Thomas, Novi, MI (US); Michael Baltaxe, Ra'anana (IL); Kobi Nistel, Zoran (IL); Ruben Mergui, Ramat-Gan (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 29 days.

(21) Appl. No.: 16/679,659

(22) Filed: Nov. 11, 2019

(65) Prior Publication Data

US 2021/0138999 A1 May 13, 2021

(51) Int. Cl.
*G06K 9/00* (2006.01)
*B60R 22/48* (2006.01)
*G06T 7/70* (2017.01)
*B60R 11/00* (2006.01)
*B60R 11/04* (2006.01)

(52) U.S. Cl.
CPC .......... *B60R 22/48* (2013.01); *G06K 9/00838* (2013.01); *G06T 7/70* (2017.01); *B60R 11/04* (2013.01); *B60R 2011/0003* (2013.01); *B60R 2022/485* (2013.01); *B60R 2022/4866* (2013.01); *B60R 2022/4891* (2013.01); *G06T 2207/30268* (2013.01)

(58) Field of Classification Search
CPC ........ B60R 22/48; G06T 7/70; G06K 9/00838
USPC ......................................................... 382/103
See application file for complete search history.

(56) References Cited

U.S. PATENT DOCUMENTS

| 10,953,850 | B1* | 3/2021 | Pertsel | B60R 22/48 |
| 2004/0068354 | A1* | 4/2004 | Tabe | B60R 22/48 701/45 |
| 2016/0046261 | A1* | 2/2016 | Gulash | G05D 1/0055 701/23 |
| 2019/0152418 | A1 | 5/2019 | Coughlin et al. | |
| 2019/0258263 | A1* | 8/2019 | Wendel | B60K 28/04 |

OTHER PUBLICATIONS

U.S. Appl. No. 16/149,730, filed Oct. 2, 2018, Thomas et al.
U.S. Appl. No. 16/253,312, filed Jan. 22, 2019, Baitaxe et al.
U.S. Appl. No. 16/389,497, filed Apr. 19, 2019, Thomas.
U.S. Appl. No. 16/389,504, filed Apr. 19, 2019, Thomas et al.
U.S. Appl. No. 16/448,932, filed Jun. 21, 2019, Baitaxe et al.

* cited by examiner

*Primary Examiner* — Stephen P Coleman
(74) *Attorney, Agent, or Firm* — Harness, Dickey & Pierce, P.L.C.

(57) ABSTRACT

A system for detecting seatbelt routing includes: a state module configured to, based on a series of images over a period of time from a camera of a vehicle facing a seat, determine and output a routing state of a seatbelt of the seat; and a remediation module configured to, based on the routing state of the seatbelt of the seat, selectively perform at least one remedial action.

19 Claims, 8 Drawing Sheets

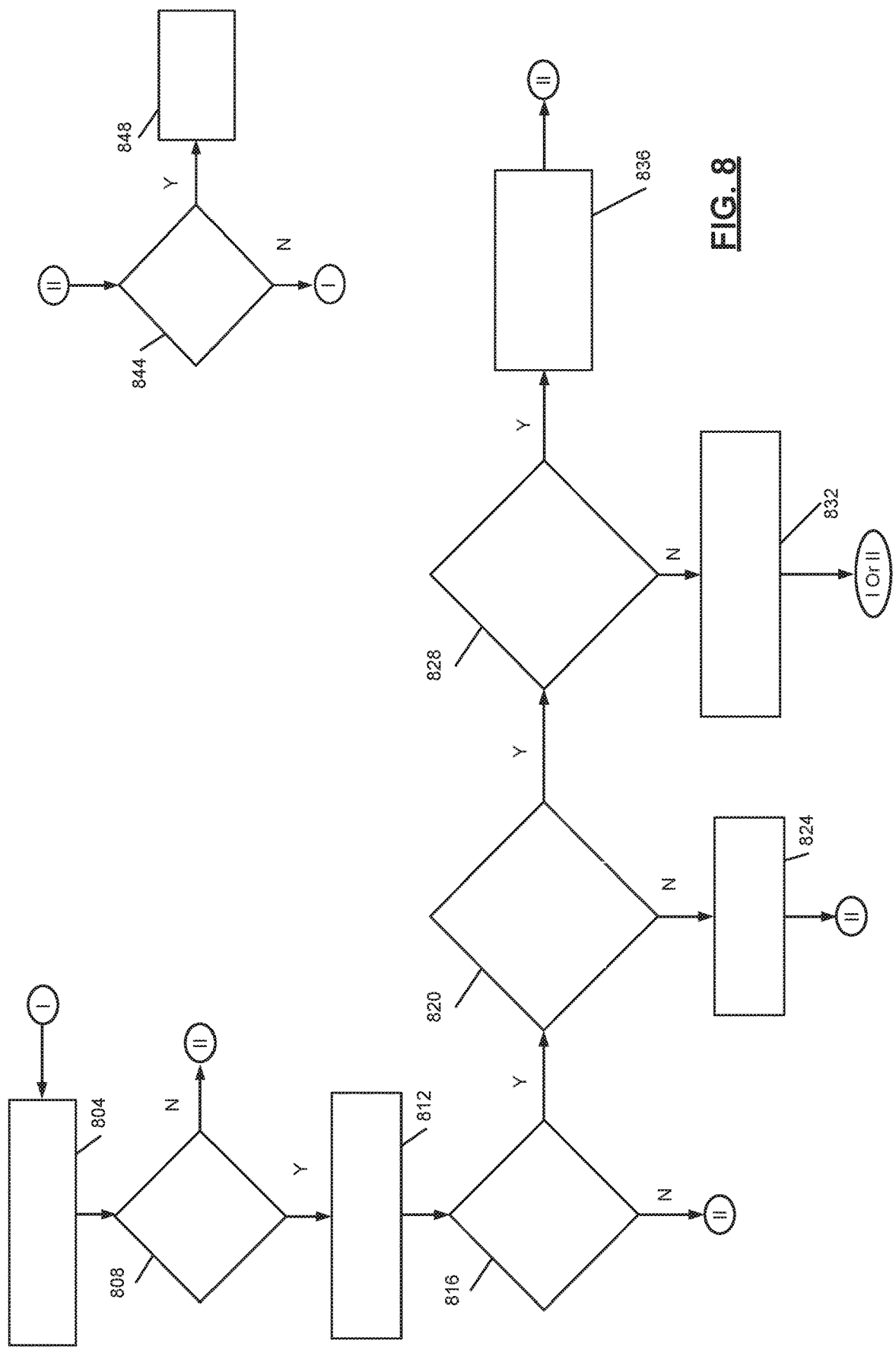

TIME BASED SEATBELT ROUTING DETECTION VIA IN-CABIN SENSORS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to seatbelt routing detection systems and methods and more particularly to systems and methods for detecting seatbelt routing using multiple images captured over time.

Vehicles include one or more torque producing devices, such as an internal combustion engine and/or an electric motor. A passenger of a vehicle rides within a passenger cabin (or passenger compartment) of the vehicle.

Autonomous driving systems drive a vehicle completely independent of a human driver. For example, autonomous driving systems control the acceleration, brake, and steering systems of a vehicle independent of a driver.

Semiautonomous driving systems drive a vehicle partially independent of a human driver. For example, a semiautonomous driving system may control the steering system independent of a driver while relying on the driver to set a target speed for the semiautonomous driving system to achieve by controlling the acceleration and brake systems.

SUMMARY

In a feature, a system for detecting seatbelt routing includes: a state module configured to, based on a series of images over a period of time from a camera of a vehicle facing a seat, determine and output a routing state of a seatbelt of the seat; and a remediation module configured to, based on the routing state of the seatbelt of the seat, selectively perform at least one remedial action.

In further features, the state module is configured to set the routing state of the seatbelt to a state indicative of proper routing of the seatbelt after seat belt buckling in response to a determination that, based on at least one of the images from the camera captured within a predetermined period before buckling of the seatbelt, a shoulder portion of the seatbelt was located in front of an occupant while the occupant was sitting on the seat.

In further features, the state module is configured to set the routing state of the seatbelt to a state indicative of a lap portion of the seatbelt being improperly routed behind an occupant of the seat in response to a determination that, based on at least one of the images from the camera: the occupant entered the seat after buckling of the seatbelt; and a shoulder portion of the seatbelt transitions to being located in front of the occupant after the occupant entered the seat.

In further features, the state module is configured to set the routing state of the seatbelt to a state indicative of both a lap portion and a shoulder portion of seatbelt being improperly routed behind an occupant of the seat in response to a determination that, based on at least one of the images from the camera: the occupant entered the seat after buckling of the seatbelt; and a shoulder portion of the seatbelt is not located in front of the occupant after the occupant entered the seat.

In further features, the state module is configured to set the routing state of the seatbelt to a state indicative of the seat being not occupied by an occupant in response to a determination that, based on at least one of the images from the camera: no occupant was present in the seat during buckling of the seatbelt and no occupant entered the seat after buckling of the seatbelt.

In further features, the state module is configured to set the routing state of the seatbelt to a state indicative of a lap portion of the seatbelt being improperly routed behind an occupant of the seat in response to a determination that, based on at least one of the images from the camera: the occupant entered the seat during buckling of the seatbelt; and a shoulder portion of the seatbelt transitions from being behind the occupant during buckling to being located in front of the occupant after buckling.

In further features, the state module is configured to set the routing state of the seatbelt to a state indicative of the seatbelt being routed under an arm of an occupant of the seat in response to a determination that, based on at least one of the images from the camera: the occupant was seated on the seat during buckling of the seatbelt; and a trajectory of the seatbelt within a predetermined period before the buckling was under the arm of the occupant.

In further features, the state module is configured to set the routing state of the seatbelt to a state indicative of the seatbelt being routed across an arm of an occupant of the seat in response to a determination that, based on at least one of the images from the camera: the occupant was seated on the seat during buckling of the seatbelt; and a trajectory of the seatbelt within a predetermined period before the buckling was across the arm of the occupant.

In further features, the state module is configured to set the routing state of the seatbelt to a state indicative of the seatbelt being routed on a wrong side of a head of an occupant of the seat in response to a determination that, based on at least one of the images from the camera: the occupant was seated on the seat during buckling of the seatbelt; and a trajectory of the seatbelt within a predetermined period before the buckling was on a side of the head the occupant closest to a buckle of the seat.

In further features, the state module is configured to set the routing state of the seatbelt to a state indicative of a shoulder portion of the seatbelt being routed behind an occupant of the seat in response to a determination that, based on at least one of the images from the camera: the occupant was seated on the seat during buckling of the seatbelt; and the shoulder portion of the seatbelt is not visible on a torso of the occupant after the buckling.

In further features, the state module is configured to set the routing state of the seatbelt to a state indicative of the seatbelt being routed under an arm of an occupant of the seat in response to a determination that: a shoulder portion of the seatbelt was located on a shoulder of the occupant in a first image captured at a first time by the camera; the shoulder portion was located across an arm of the occupant in a second image captured at a second time by the camera, where the second time is after the first time; and the shoulder portion was located under the arm of the occupant in a third image captured at a third time by the camera, where the third time is after the second time.

In further features, the state module is configured to set the routing state of the seatbelt to a state indicative of the seatbelt being routed on a wrong side of a head of an occupant of the seat in response to a determination that: a shoulder portion of the seatbelt was located on a shoulder of the occupant in a first image captured at a first time by the camera; the shoulder portion was located over the head of the occupant in a second image captured at a second time by the camera, where the second time is after the first time; and the shoulder portion was located on the wrong side of the head of the occupant and across a torso of the occupant in a third image captured at a third time by the camera, where the third time is after the second time.

In further features, the state module is configured to set the routing state of the seatbelt to a state indicative of the shoulder belt portion of the seatbelt being routed behind an occupant of the seat in response to a determination that: a shoulder portion of the seatbelt was located on a shoulder of the occupant in a first image captured at a first time by the camera; the shoulder portion was located over a head of the occupant in a second image captured at a second time by the camera, where the second time is after the first time; and the shoulder portion was not located on a torso of the occupant in a third image captured at a third time by the camera, where the third time is after the second time.

In further features, the state module is configured to set the routing state of the seatbelt to a state indicative of the seatbelt being routed across an arm of an occupant of the seat in response to a determination that: a shoulder portion of the seatbelt was located on a shoulder of the occupant in a first image captured at a first time by the camera; and the shoulder portion was located across the arm of the occupant in a second image captured at a second time by the camera, where the second time is after the first time.

In further features, the state module is configured to maintain the routing state the seatbelt in response to a determination that: a difference between (a) a first visible location of a shoulder portion of the seatbelt in a first or second image captured by the camera at a first or second time and (b) a second visible location of the shoulder portion of the seatbelt in a third image captured by the camera at a third time is less than a predetermined change value, where the third time is after the second time.

In further features, the state module is configured to change the routing state the seatbelt in response to a determination that: a difference between (a) a first visible location of a shoulder portion of the seatbelt in a first or second image captured by the camera at a first or second time and (b) a second visible location of the shoulder portion of the seatbelt in a third image captured by the camera at a third time is greater than a predetermined change value, where the third time is after the second time.

In further features, the remediation module is configured to, based on the routing state of the seatbelt, selectively one of: transmit a message to a remote location; limit a speed of the vehicle to a predetermined maximum speed; prevent movement of the vehicle; and slow the vehicle to a stop.

In further features, the remediation module is configured to, based on the routing state of the seatbelt, activate at least one of: a visual warning device; an audible warning device; and a haptic warning device.

In further features, the state module is configured to disable the determination and output of the routing state of the seatbelt in response to at least one of: the vehicle being transitioned off; and a hibernation mode being entered.

In a feature, a method for detecting seatbelt routing includes: based on a series of images over a period of time from a camera of a vehicle facing a seat, determining and a routing state of a seatbelt of the seat; and based on the routing state of the seatbelt of the seat, selectively performing at least one remedial action.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 5-8 are flowcharts depicting example methods of detecting routing of a seatbelt of a seat.

In the drawings, reference numbers may be reused to identify similar and/or identical elements.

DETAILED DESCRIPTION

Vehicles include seats upon which occupants can sit. Each seat has an associated seatbelt that can be used to restrain an occupant of that seat.

Seatbelts, however, can be improperly routed despite being buckled. For example, a seatbelt can be buckled prior to an occupant entering a seat such that the seatbelt is buckled with a lap portion and a shoulder portion of the seatbelt located behind the occupant. Even when the seatbelt is buckled around the occupant after the occupant enters the seat, the shoulder portion of the seatbelt can be improperly routed by being moved behind the occupant, on a wrong side of the head of the occupant, across an arm of the occupant, or under an arm of the occupant. The present application involves use of a time series of images captured using a camera or another type of other cabin monitoring system that can detect the presence of the seat, seatbelt, and occupant to determine seatbelt routing. This allows for robust detection of seatbelt routing, even when seatbelt routing is obscured.

Figure 1:
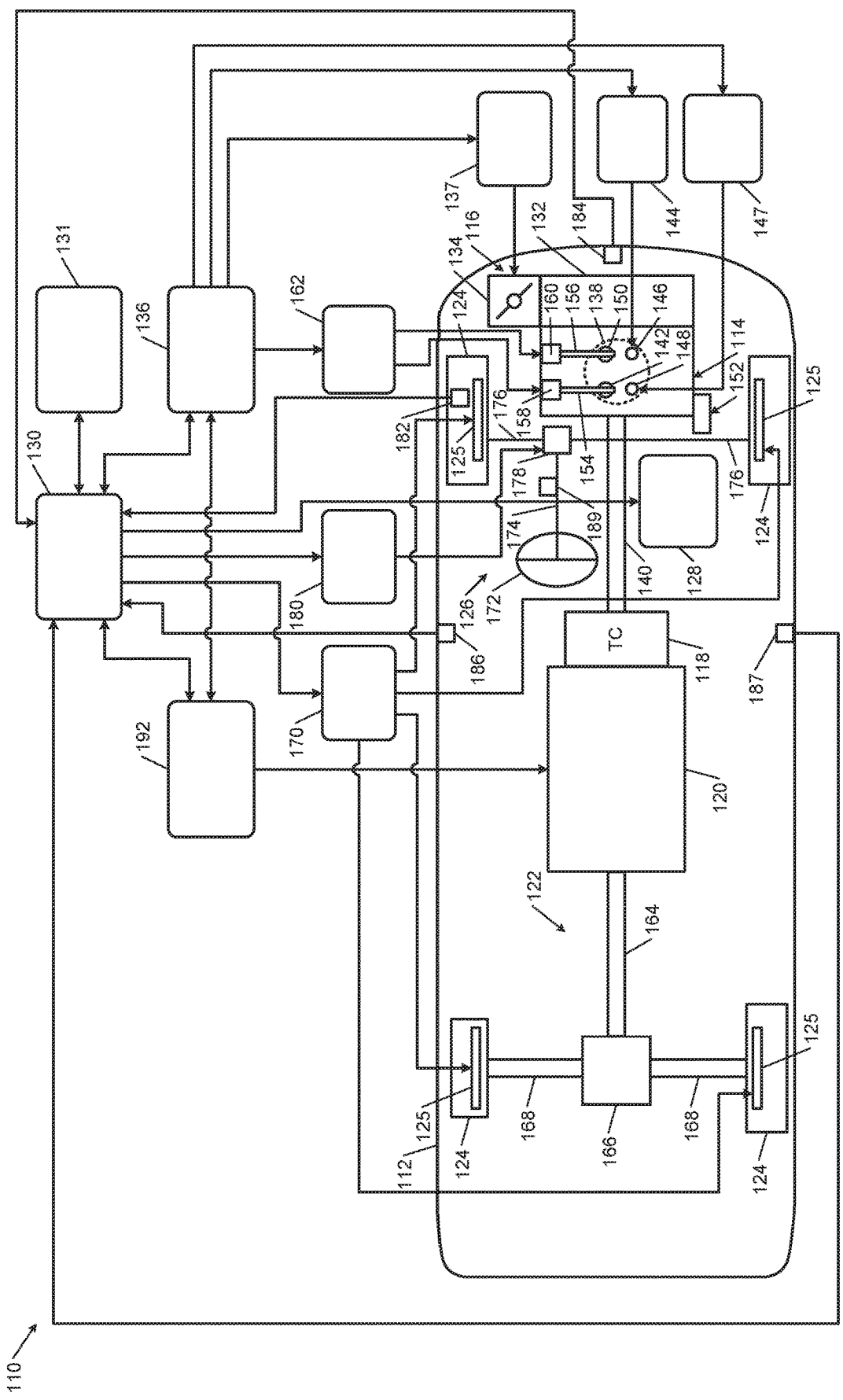
FIG. 1 is a functional block diagram of an example vehicle system.

FIG. 1 includes a functional block diagram including an example vehicle system. While one example type of vehicle is provided, the present application is applicable to other types of vehicles including, among other things, electrified vehicles and autonomous vehicles.

A vehicle 110 may include a vehicle body 112, an engine 114, an intake system 116, a torque converter 118, a transmission 120, a driveline 122, wheels 124, friction brakes 125, a steering system 126, and a warning device 128. The engine 114 combusts an air/fuel mixture to produce drive torque for the vehicle 110. The amount of drive torque produced by the engine 114 is based on a driver input and/or a first input from a driving control module (DCM) 130. The driver input may include, for example, an accelerator pedal position, a brake pedal position, and/or one or more other driver inputs. The first input from the DCM 130 may be a target vehicle acceleration.

The DCM 130 may adjust the target vehicle acceleration, for example, to achieve a target vehicle speed or to maintain at least a predetermined distance between the vehicle and an object in front of the vehicle 110. The DCM 130 may determine the target vehicle speed based on the location of the vehicle 110 and a speed limit for the road on which the vehicle 110 is travelling. The DCM 130 may determine the speed limit, for example, based on an input received from a global positioning system (GPS) module 131 or by identifying the speed limit posted on a speed limit sign from an image captured using a camera. The GPS module 131 may be onboard (e.g., part of) the vehicle 110 or the GPS module 131 may be remote from (e.g., separate from) the vehicle 110. The GPS module 131 includes a transceiver for communicating with a GPS satellite.

Air is drawn into the engine 114 through the intake system 116. The intake system 116 includes an intake manifold 132 and a throttle valve 134. The throttle valve 134 may include a butterfly valve having a rotatable blade. An engine control module (ECM) 136 controls a throttle actuator module 137, and the throttle actuator module 137 regulates opening of the throttle valve 134 to control the amount of air drawn into the intake manifold 132.

Air from the intake manifold 132 is drawn into cylinders of the engine 114. While the engine 114 may include multiple cylinders, for illustration purposes a single representative cylinder 138 is shown. For example only, the engine 114 may include 2, 3, 4, 5, 6, 8, 10, and/or 12 cylinders. The ECM 136 may deactivate some of the cylinders, which may improve fuel economy under certain operating conditions.

The engine 114 may operate using a four-stroke cycle or another suitable combustion cycle. The four strokes, described below, are named the intake stroke, the compression stroke, the combustion stroke, and the exhaust stroke. During each revolution of a crankshaft 140, two of the four strokes occur within the cylinder 138. Therefore, two crankshaft revolutions are necessary for the cylinder 138 to experience all four of the strokes.

During the intake stroke, air from the intake manifold 132 is drawn into the cylinder 138 through an intake valve 142. The ECM 136 controls a fuel actuator module 144, which regulates fuel injection performed by a fuel injector 146 to achieve a target air/fuel ratio. Fuel may be injected into the intake manifold 132 at a central location or at multiple locations, such as near the intake valve 142 of each of the cylinders. In various implementations, fuel may be injected directly into the cylinders or into mixing chambers associated with the cylinders. The fuel actuator module 144 may halt injection of fuel to cylinders that are deactivated.

The injected fuel mixes with air and creates an air/fuel mixture in the cylinder 138. During the compression stroke, a piston (not shown) within the cylinder 138 compresses the air/fuel mixture. The engine 114 may be a compression-ignition engine, in which case compression in the cylinder 138 ignites the air/fuel mixture. Alternatively, the engine 114 may be a spark-ignition engine, in which case a spark actuator module 147 energizes a spark plug 148 to generate a spark in the cylinder 138 based on a signal from the ECM 136, which ignites the air/fuel mixture. The timing of the spark may be specified relative to the time when the piston is at its topmost position, referred to as top dead center (TDC).

The spark actuator module 147 may be controlled by a spark timing signal specifying how far before or after TDC to generate the spark. Because piston position is directly related to crankshaft rotation, operation of the spark actuator module 147 may be synchronized with crankshaft angle. In various implementations, the spark actuator module 147 may halt provision of spark to deactivated cylinders.

Generating the spark may be referred to as a firing event. The spark actuator module 147 may have the ability to vary the timing of the spark for each firing event. The spark actuator module 147 may even be capable of varying the spark timing for a next firing event when the spark timing signal is changed between a last firing event and the next firing event. In various implementations, the engine 114 may include multiple cylinders and the spark actuator module 147 may vary the spark timing relative to TDC by the same amount for all cylinders in the engine 114.

During the combustion stroke, combustion of the air/fuel mixture drives the piston down, thereby driving the crankshaft 140. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 150. The byproducts of combustion are exhausted from the vehicle via an exhaust system 152.

The intake valve 142 may be controlled by an intake camshaft 154, while the exhaust valve 150 may be controlled by an exhaust camshaft 156. In various implementations, multiple intake camshafts (including the intake camshaft 154) may control multiple intake valves (including the intake valve 142) for the cylinder 138 and/or may control the intake valves (including the intake valve 142) of multiple banks of cylinders (including the cylinder 138). Similarly, multiple exhaust camshafts (including the exhaust camshaft 156) may control multiple exhaust valves for the cylinder 138 and/or may control exhaust valves (including the exhaust valve 150) for multiple banks of cylinders (including the cylinder 138).

The time at which the intake valve 142 is opened may be varied with respect to piston TDC by an intake cam phaser 158. The time at which the exhaust valve 150 is opened may be varied with respect to piston TDC by an exhaust cam phaser 160. A valve actuator module 162 may control the intake and exhaust cam phasers 158, 160 based on signals from the ECM 136. When implemented, variable valve lift may also be controlled by the valve actuator module 162.

The valve actuator module 162 may deactivate the cylinder 138 by disabling opening of the intake valve 142 and/or the exhaust valve 150. The valve actuator module 162 may disable opening of the intake valve 142 by decoupling the intake valve 142 from the intake cam phaser 158. Similarly, the valve actuator module 162 may disable opening of the exhaust valve 150 by decoupling the exhaust valve 150 from the exhaust cam phaser 160. In various implementations, the valve actuator module 162 may control the intake valve 142 and/or the exhaust valve 150 using devices other than camshafts, such as electromagnetic or electrohydraulic actuators.

The ECM 136 adjusts the position of the throttle valve 134, the amount and/or timing of fuel injections performed by the fuel injector 146, the timing at which spark is generated by the spark plug 148, and/or the timing at which the intake and exhaust valves 142 and 150 are opened to achieve a target torque output of the engine 114.

The ECM 136 determines the target engine torque based on the driver input and/or the first input from the DCM 130. The ECM 136 may determine whether to determine the target engine torque based on the driver input or the first input based on a second input from the DCM 130. The DCM 130 may control whether the ECM 136 uses the driver input or the first input to determine the target engine torque based on whether the driver's foot is on the accelerator pedal. The DCM 130 may determine that the driver's foot is on the accelerator pedal when the accelerator pedal position indicates a pedal depression level that is greater than a predetermined amount.

Torque output at the crankshaft 140 is transferred through the torque converter 118, through the transmission 120, through the driveline 122, and to the wheels 124. The driveline 122 includes a drive shaft 164, a differential 166, and axle shafts 168. The torque converter 118, the transmission 120, and the differential 166 amplify engine torque by several gear ratios to provide axle torque at the axle shafts 168. The axle torque rotates the wheels 124, which causes the vehicle 110 to accelerate in a forward or rearward direction.

The friction brakes 125 are mounted to the wheels 124. The friction brakes 125 resist (slow) rotation of the wheels 124 when the friction brakes 125 are applied. The friction brakes 125 may include drum brakes and/or disc brakes, and may include electrohydraulic actuators and/or electromechanical actuators that press a brake pad against a brake disc and/or drum when the friction brakes 125 are applied.

A brake actuator module 170 applies the friction brakes 125 based on a brake pedal position and/or a signal from the DCM 130. The friction brakes 125 may be independently applied at different levels. The DCM 130 may apply the friction brakes 125, for example, to maintain the target vehicle speed and/or to maintain at least the predetermined distance between the vehicle and an object in front of the vehicle 110.

The steering system 126 selectively turns the front wheels 124, thereby turning the vehicle 110. The steering system 126 includes a steering wheel 172, a steering column 174, one or more steering linkages 176, and a steering actuator 178. A driver may rotate the steering wheel 172 to turn the vehicle 110 left or right or to input a request to turn the vehicle 110 left or right. The steering column 174 is coupled to the steering wheel 172 so that the steering column 174 rotates when the steering wheel 172 is rotated. The steering column 174 may also be coupled to the steering linkages 176 so that rotation of the steering column 174 causes translation of the steering linkages 176. The steering linkages 176 are coupled to the front wheels 124 so that translation of the steering linkages 176 turns the wheels 124.

The steering actuator 178 is coupled to the steering linkages 176 and translates the steering linkages 176, thereby turning the front wheels 124. In various implementations, the steering actuator 178 may be an electrohydraulic and/or electromechanical actuator. In implementations where the steering column 174 is coupled to the steering linkages 176, such as power steering systems, the steering actuator 178 may reduce the amount of effort that the driver must exert to turn the vehicle 110 left or right. In various implementations, the steering column 174 may not be coupled to the steering linkages 176, and the steering actuator 178 alone may translate the steering linkages 176. Steering systems where the steering column 174 is not coupled to the steering linkages 176 may be referred to as a steer-by-wire system.

A steering actuator module 180 adjusts actuation of the steering actuator 178 based on a signal from the DCM 130. The DCM 130 may control the steering actuator 178 based on the angular position of the steering wheel 172. Alternatively, the DCM 130 may control the steering actuator 178 autonomously (e.g., independent of the angular position of the steering wheel 172). For example, the DCM 130 may control the steering actuator 178 to minimize a difference between a target path of the vehicle 110 and an actual path of the vehicle 110 or to center the vehicle 110 between lane lines. As another example, the DCM 130 may control the steering actuator 178 to cause the vehicle to not contact one or more targets located in the path of the vehicle.

One or more wheel speed sensors 182 are mounted to one or more of the wheels 124 and measures the speed of wheels 124, respectively. For example, one wheel speed sensor may be provided for each wheel and measure that wheels wheel speed.

The vehicle 110 may include one or more types of object sensors. For example, side facing cameras 186 and 187 may be mounted to the left and right sides of the vehicle body 112 and generate images of the environment on the left and right sides of the vehicle 110, respectively. The side facing cameras 186 and 187 may be implemented under left and right outside rear view mirrors, respectively, of the vehicle. The vehicle 110 may additionally or alternatively include one or more other types of object sensors, such as one or more light detection and ranging (LIDAR) sensors and/or one or more radar sensors.

A steering wheel angle sensor 189 measures the angular position of the steering wheel 172 relative to a predetermined position. The predetermined position may correspond to a location where the vehicle should (or does) travel straight along a longitudinal axis of the vehicle. The steering wheel angle sensor 190 may be mounted to the steering column 174 and may include, for example, a Hall Effect sensor that measures the angular position of a shaft that is disposed within the steering column 174 and rotatably coupled to the steering wheel 172.

A transmission control module (TCM) 192 controls a gear ratio of the transmission 120 based on operating conditions of the vehicle 110 and a predetermined shift schedule. The operating conditions may include the speed of the vehicle 110, a target acceleration of the vehicle 110, and/or a target torque output of the engine 114. The TCM 192 may determine a vehicle speed based on wheel speeds measured using the wheel speed sensors 182. For example, the TCM 192 may determine the vehicle speed based on an average of the wheel speeds or an average of speeds of undriven (i.e., non-driven) wheels of the vehicle. The TCM 192 may receive the target vehicle acceleration and/or the target engine torque from the DCM 130 and/or the ECM 136. The ECM 136 may communicate with the TCM 192 to coordinate gear ratio shifts in the transmission 120. For example, the ECM 136 may reduce engine torque during a gear shift.

The DCM 130 may adjust the target path of the vehicle 110, for example, to maintain the vehicle 110 within the boundaries of a lane in which the vehicle 110 is travelling or to avoid one or more objects in the present path of the vehicle 110. The DCM 130 may activate the warning device 128, for example, to notify the driver of a potential lane departure.

The warning device 128 may include an electronic display (e.g., a touchscreen display) that is within the view of the driver and is operable to display lights, text, and/or images. Additionally or alternatively, the warning device 128 may include a heads-up display (HUD) that, for example, projects light, text, and/or images onto a windshield (not shown) of the vehicle 110. Additionally or alternatively, the warning device 128 may include one or more vibrators mounted to, for example, the steering wheel 172 and/or the driver's seat (not shown) to provide haptic feedback to the driver. Additionally or alternatively, the warning device 128 may include an audio system (e.g., including an audio driver and a speaker) that is operable to output a sound or audible message within the vehicle 110. In various implementations, the warning device 128 may include multiple different devices configured to generate an output (e.g., audible, visual, haptic) within a passenger cabin of the vehicle 110. The warning device 128 may additionally or alternatively send a message to a remote location (e.g., a home office), such as to warn staff so the staff can initiate a dialogue with the vehicle occupant to resolve the situation.

Figure 2:
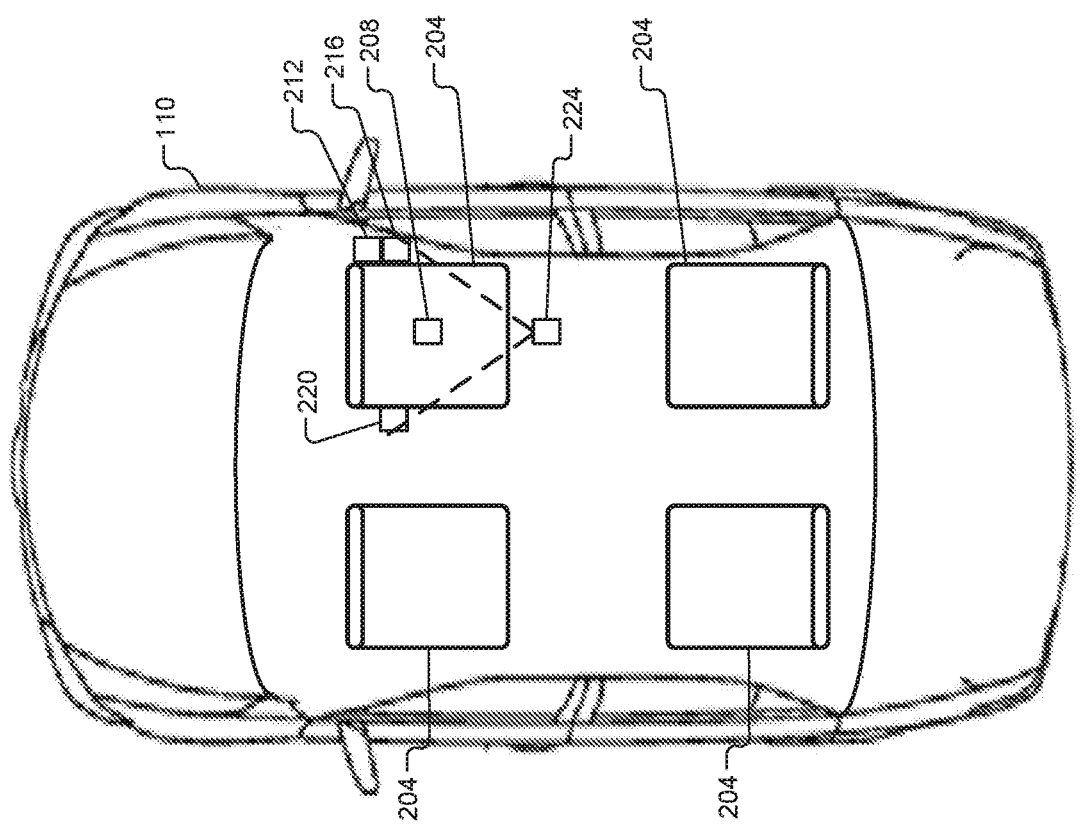
FIG. 2 is a top view of an example implementation of a vehicle.

FIG. 2 includes a top view of an example implementation of the vehicle 110. The vehicle 110 includes one or more vehicle seats 204. The vehicle seats 204 may include only forward facing seats or a combination of forward and rear racing seats as shown or side facing seats (not shown). In various implementations, one or more of the vehicle seats 204 may be rotatable within the vehicle 110. While the example of four seats is provided, the present application is applicable to vehicles having one seat or more than one seat.

Each vehicle seat may include a seat sensor, such as seat sensor 208. The seat sensors may be located in the cushions of the seats. The seat sensor 208 may set an occupancy signal to a first state indicating that its seat is occupied when at least a predetermined mass or weight is present on the cushion of its seat. Each seat sensor may set an occupancy signal to a second state indicating that its seat is not occupied when less than the predetermined mass or weight is present on the cushion of its seat. Alternatively one or more sensors remote from the seat can be used to detect seat occupancy and provide an occupancy signal or non-occupied signal. The remote sensor(s) can be used instead of the seat sensor 208 or in addition to seat sensor 208. In addition, either sensing system may be able to distinguish occupants sitting on the seat from occupants sitting in child restraint seats on the vehicle seat or from objects placed on the vehicle seat.

Each vehicle seat 204 has an associated seatbelt, such as seatbelt generally illustrated in FIG. 2 by 212. The seatbelt 212 includes a belt portion and a latch plate portion (412 in FIG. 4). The latch plate portion 412 is configured to be releasably engaged with a seat belt buckle (416 in FIG. 4). The belt portion is looped through the latch plate portion 412 as to create a lap belt portion (420 in FIG. 4) and a shoulder belt portion (408 in FIG. 4) when the latch plate portion 412 is engaged with the seat belt buckle 416.

A payout sensor 216 measures a length of the belt portion that is (presently) dispensed from a seatbelt reel. The payout sensor 216 generates a payout signal that indicates the length of the belt portion that is dispensed. A buckle sensor 220 determines and indicates whether the seat belt buckle 416 of the seatbelt 212 is (presently) engaged with the latch plate portion 412. For example, the buckle sensor 220 may set a buckle signal to a first state when the latch plate portion 412 is engaged with the seat belt buckle 416, and set the buckle signal to a second state when the latch plate portion 412 is not engaged with the seat belt buckle 416. Each seat has an associated seatbelt, buckle sensor, payout sensor, and occupancy sensor.

A camera 224 is configured to capture images including the vehicle seat 204, the seatbelt 212, and, if present, an occupant sitting on the vehicle seat 204, a child in a child restraint seat on the vehicle seat 204, a child restraint seat on the vehicle seat 204, or an object on the vehicle seat 204. While the example of the camera 224 is shown and discussed, the another type of in-cabin sensor may be used in addition to or as an alternative to the camera 224. While the example of the camera 224 will be discussed, the following is also applicable to another type of in cabin sensor. In various implementations, the camera 224 may be located and configured to capture images of multiple vehicle seats, seatbelts, and occupants. Alternatively, one camera may be provided per vehicle seat and configured to capture images of that vehicle seat, seatbelt, and occupant.

Figure 3:
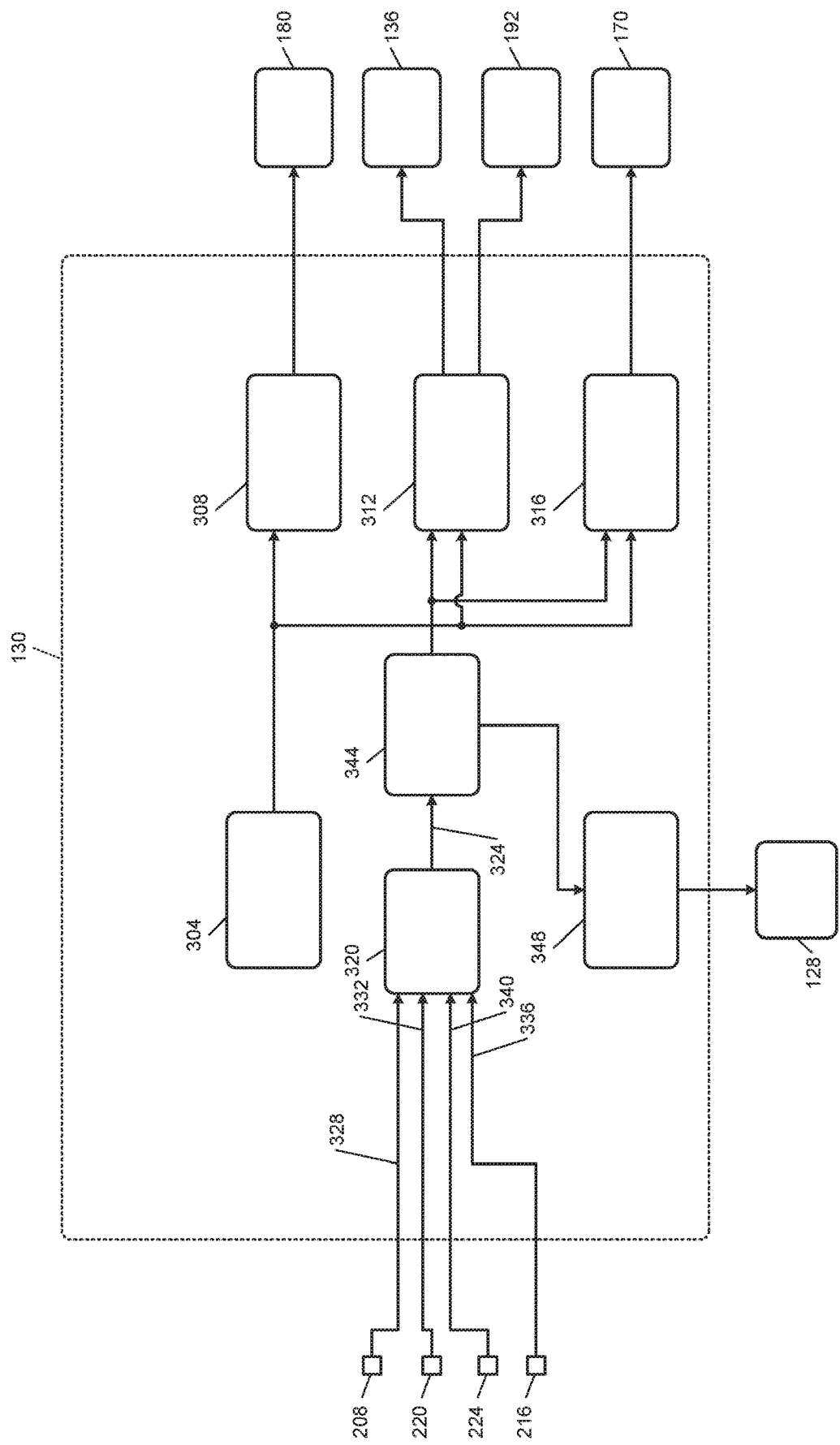
FIG. 3 is a functional block diagram of an example implementation of a driving control module.

FIG. 3 includes a functional block diagram of an example implementation of the DCM 130. An avoidance module 304 may adjust one or more vehicle operating parameters, for example, to cause the vehicle to not contact any objects/targets identified using one or more sensors. For example, the avoidance module 304 may selectively prompt a steering control module 308 to steer the vehicle 110 left or right to avoid a target. The steering control module 308 steers the vehicle 110 left or right via the steering actuator module 180 based on input from the avoidance module 304. Additionally or alternatively, the avoidance module 304 may selectively prompt an acceleration control module 312 to decelerate the vehicle 110 or prevent acceleration of the vehicle 110 to avoid a target. The acceleration control module 312 decelerates the vehicle 110 or prevents vehicle acceleration based on input from the avoidance module 304. The acceleration control module 312 may decelerate the vehicle 110 or prevent acceleration, for example, by adjusting one or more engine actuators (via the ECM 136) and/or adjust one or more transmission actuators (via the TCM 192). The engine actuators may include, for example, the throttle valve 134, the fuel injectors, the spark plugs, camshaft phasers, and/or other types of engine actuators. The transmission actuators may include, for example, gear ratio, one or more clutches, and/or other types of transmission actuators. Additionally or alternatively, the avoidance module 304 may selectively prompt a brake control module 316 to apply the friction brakes 125 to avoid a target. The brake control module 316 applies the friction brakes 125 via the brake actuator module 170 based on input from the avoidance module 304.

A state module 320 determines a state 324 of the occupant and seatbelt 212 of the vehicle seat 204 based on an occupancy signal 328 from the seat sensor 208 of the vehicle seat 204, a buckle signal 332 from the buckle sensor 220 of the vehicle seat 204, and a payout signal 336 from the payout sensor 216. The state module 320 determines the state 324 further based on images 340 of the occupant and the seatbelt 212 captured over time using the camera 224 or other in-cabin sensor.

A remediation module 344 selectively takes one or more remedial actions based on the state 324 of the occupant and the seatbelt 212 when the seatbelt 212 placement is improper. Examples of improper placement of the seatbelt 212 include improper lap belt routing, improper shoulder belt routing, and improper routing of both the lap belt and the shoulder belt. For example, the remediation module 344 may, based on the state 324 of the seatbelt 212 selectively contact the remote location or prompt the acceleration control module 312 to limit the speed of the vehicle 110 to a predetermined speed, stop the vehicle 110 or maintain the vehicle 110 stopped, and/or perform one or more other remedial actions. The acceleration control module 312 controls acceleration or deceleration based on input from the remedial action module 344. Additionally or alternatively, the remediation module 344 may, based on the state 324 of the seatbelt 212, selectively prompt the brake control module 316 to apply the friction brakes 125. The brake control module 316 applies the friction brakes 125 via the brake actuator module 170 based on input from the remedial action module 344.

One or more other actions may additionally or alternatively be taken. For example, the remediation module 344 may prompt a warning module 348 to activate the warning device 128 based on the state 324 of the seatbelt 212. For example, the warning module 348 may activate the warning device 128 when the seatbelt 212 is improperly routed. Activation of the warning device 128 may include, for example, at least one of activating a light, activating a haptic device, and outputting an audible warning. The remediation module 344 or the warning device 128 can also contact the remote location, such as when the vehicle is an autonomous vehicle, for example, to warn staff so they can initiate dialogue with the vehicle occupant to remedy improper seatbelt routing. One or more other actions may additionally or alternatively be taken based on the state 324 of the occupant and the seatbelt 212.

Figure 4:
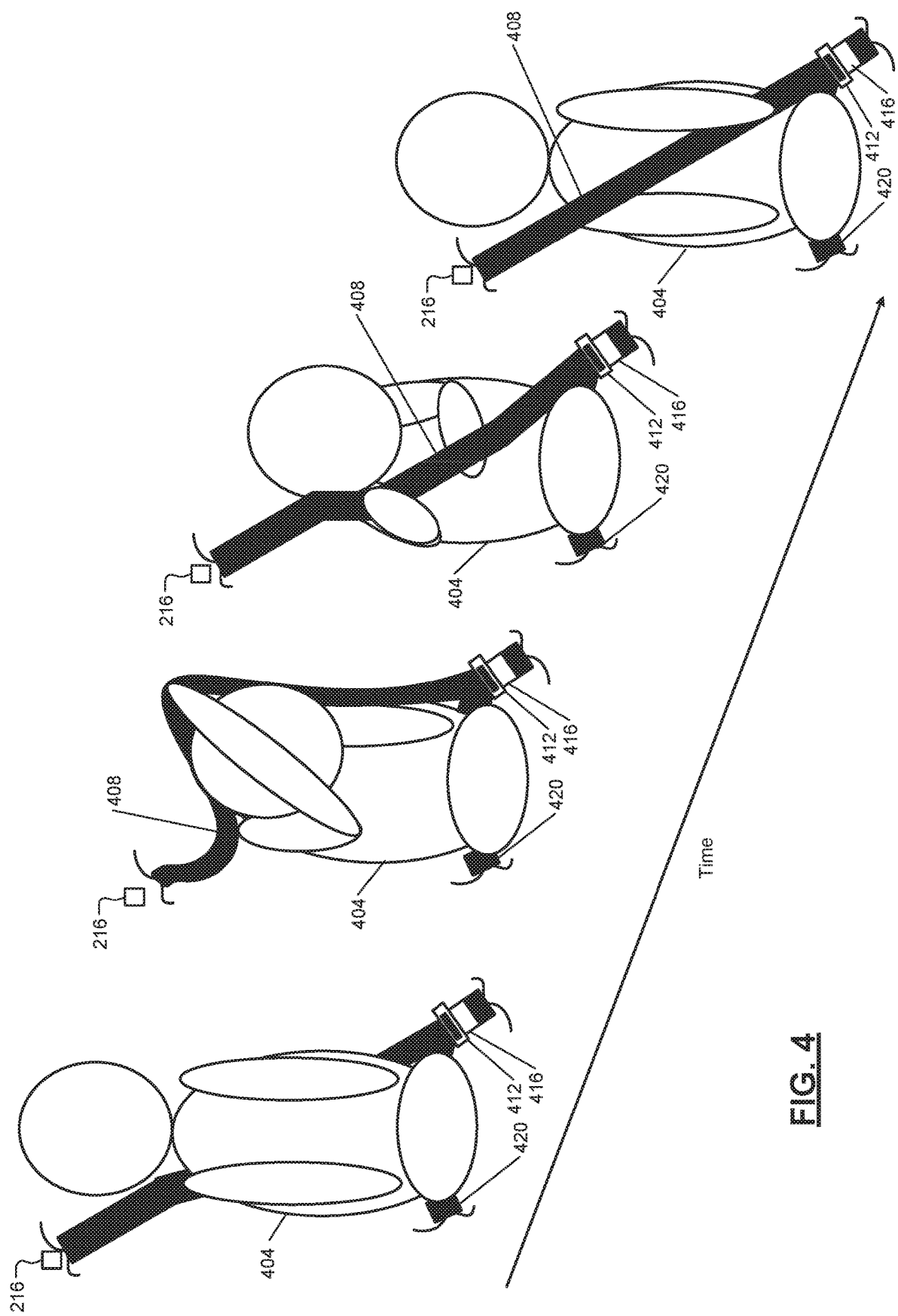
FIG. 4 illustrates a time series of images of an occupant of a seat improperly routing a seatbelt such that only a shoulder portion of seatbelt is moved in front of the occupant while a lap portion of the seatbelt remains behind the occupant.

FIG. 4 illustrates a time series of images of an occupant 404 improperly routing a seatbelt such that only a shoulder portion 408 of seatbelt is moved in front of the occupant 404 while the lap portion 420 of the seatbelt remains behind the occupant 404. In this example, the seatbelt is initially buckled behind the occupant 404. The occupant then draws the shoulder portion 408 of the seatbelt over the occupant's head. The lap portion 420 of the seatbelt, however, remains behind the occupant 404.

Figure 5:
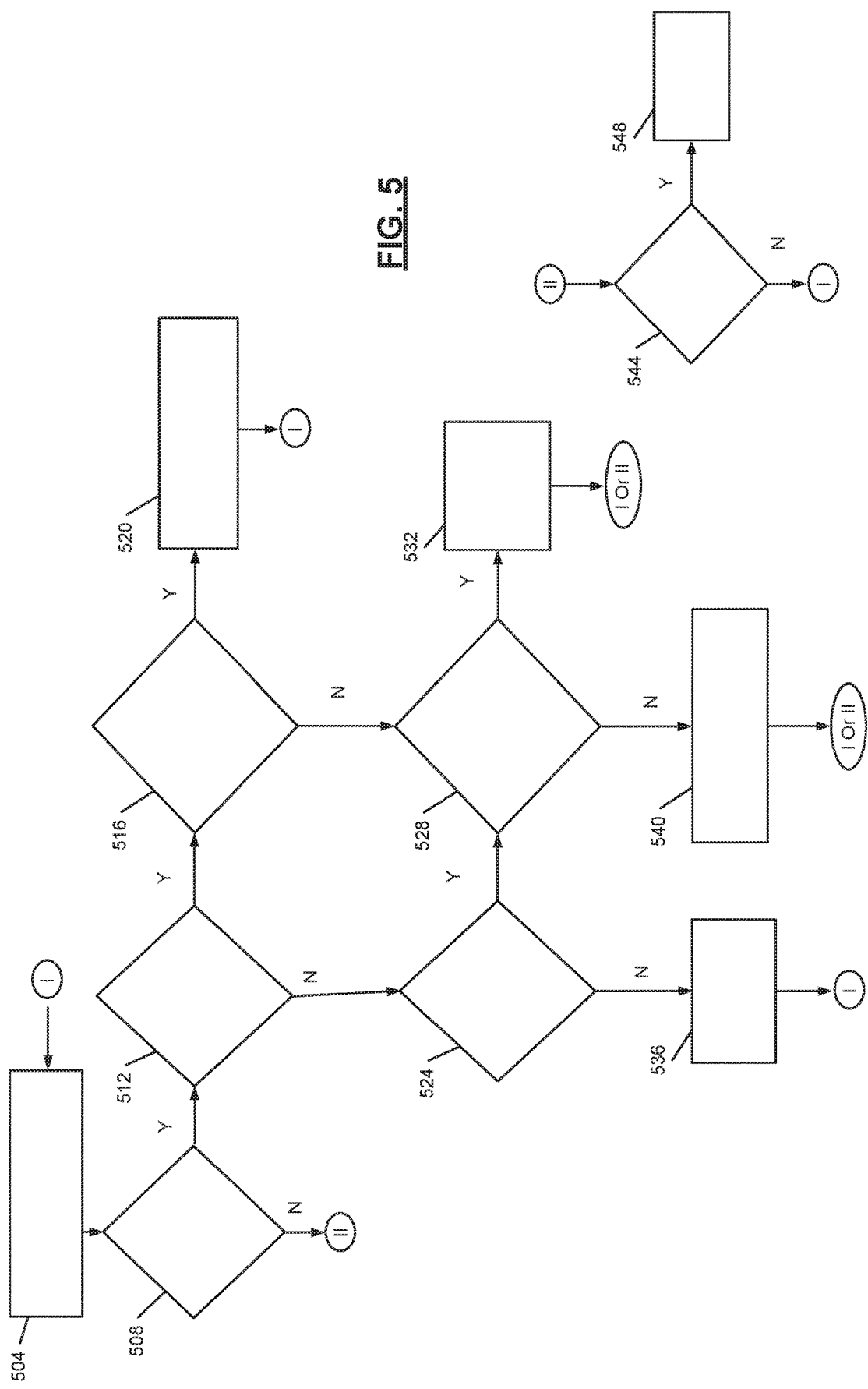

FIG. 5 is a flowchart depicting an example method of detecting routing of the seatbelt 212 of the vehicle seat 204 that assesses occupant presence and if the shoulder belt is in front of the occupant when the seat belt is being buckled up occupant presence and if the shoulder belt is in front of the occupant after the seat belt is buckled. The method may be performed for each seat. Control begins at 504 where the method is activated. The method may be activated, for example, when the vehicle is turned on (e.g., an ignition system is turned on), when a change in seat occupancy is detected, when a change in occupant position/posture is detected, when an event that obscures the view of the seat belt is detected and/or when the state module 320 determines that a change (e.g., greater than a predetermined amount) in the payout 336 occurred. The method may also be activated at other times, such as when the doors are closed or when the vehicle is placed into a drive state.

At 508, the state module 320 determines whether the seatbelt (buckle) transitioned from unbuckled to buckled. For example, the state module 320 may determine whether the buckle signal 332 transitioned from the second state to the first state. If 508 is true (meaning the seat belt was just buckled), control continues with 512. If 508 is false (meaning that the seat belt was not just buckled), control transfers to II of FIG. 5, which is discussed further below.

At 512, the state module 320 determines whether an occupant was present in the vehicle seat 204 at the time that the seatbelt 212 was buckled (e.g., when the buckle signal 332 transitioned from the second state to the first state). If 512 is true (meaning an occupant was present), control transfers to 516. If 512 is false (meaning an occupant was not present), control continues with 524, which is discussed further below. The state module 320 may determine that the occupant was present in the vehicle seat 204, for example, when the occupancy signal 328 was in the first state at the time that the seatbelt 212 was buckled.

At 516, the state module 320 determines whether the shoulder portion of the seatbelt 212 was present in front of the occupant (e.g., continuously) during the buckling of the seatbelt 212 (e.g., a predetermined period before the seatbelt 212 was buckled). Alternatively, the state module 320 may determine whether the shoulder portion of the seatbelt 212 was present in front of the occupant at the time that the seatbelt 212 was buckled. The state module 320 makes the determination based on images 340 from the camera 224. The state module 320 may include, for example, a convolutional neural network (CNN), that determines a location of the shoulder portion of the seatbelt 212 in the images 340. While the example of a CNN is provided, the state module 320 may implement another suitable type of image processing. If 516 is true (meaning the shoulder belt was in front of the occupant), the state module 320 sets the state 324 to a first state at 520. The first state may indicate that both the shoulder portion and the lap portion of the seatbelt 212 are properly routed. If 516 is false (meaning the shoulder belt was not in front of the occupant), control continues with 528, which is discussed further below.

At 524, the state module 320 determines whether an occupant was present on the seat after the seatbelt 212 was buckled (e.g., after the buckle signal 332 transitioned from the second state to the first state). If 524 is false (meaning the occupant was not present), the state module 320 sets the state 324 to a second state at 536. The second state may indicate that no occupant is present on the vehicle seat 204 (e.g., the seat is not occupied) at 536, and control may return to I of FIG. 5. If 524 is true (meaning the occupant was present), control transfers to 528.

At 528, the state module 320 determines whether the shoulder portion of the seatbelt was present in front of the occupant after the seatbelt 212 was buckled (e.g., after the buckle signal 332 transitioned from the second state to the first state). If 528 is false (meaning the shoulder belt was not present in front of the occupant), control transfers to I or II of FIG. 5. If 528 is true (meaning the shoulder belt was present in front of the occupant), the state module 320 sets the state 324 to a third state at 532, and control transfers to I or II of FIG. 5. The third state may indicate that the lap belt is not properly routed in front of or over the occupant. The remediation module 344 may take one or more remedial actions when the state 324 is in the third state. For example, the remediation module 344 may prompt the warning module 348 to activate the warning device 128. Additionally or alternatively, the remediation module 344 may contact the remote location or prompt the acceleration control module 312 and/or the brake control module 316 to limit the vehicle speed to a predetermined maximum speed or to prevent movement of the vehicle. If 528 is false (meaning the shoulder belt was not present in front of the occupant), the state module 320 sets the state 324 to a fourth state at 540, and control transfers to I or II of FIG. 5. The fourth state may indicate that the neither the lap portion nor the shoulder portion of the seatbelt 212 is properly routed in front of the occupant. The remediation module 344 may take one or more remedial actions when the state 324 is in the fourth state. For example, the remediation module 344 may prompt the warning module 348 to activate the warning device 128. Additionally or alternatively, the remediation module 344 may contact the remote location or prompt the acceleration control module 312 and/or the brake control module 316 to limit the vehicle speed to a predetermined maximum speed or to prevent movement of the vehicle.

II of FIG. 5 continues with 544. At 544, the state module 320 determines whether to deactivate the method. For example, the state module 320 may determine whether the vehicle has been turned off or a hibernation mode has been entered at 544. The following are some examples where a hibernation mode can be invoked: a) if the seat belt payout as measured by a payout sensor has not varied beyond a predetermined amount for a predetermined period of time, b) the seat belt routing as measured by the camera 224 has not varied beyond a predetermined amount for a predetermined period of time, c) a predetermined period has passed since the vehicle was placed in a drive state, d) the seat belt is not buckled, and e) an occupant has not been detected. If 544 is true (meaning that the vehicle has been turned off or a hibernation mode has occurred), control may end or proceed with another method (e.g., the example of FIG. 6) at 548. If 544 is false (meaning that the vehicle has not been turned off and there is no active hibernation mode), control may return to I of FIG. 5.

Figure 6:
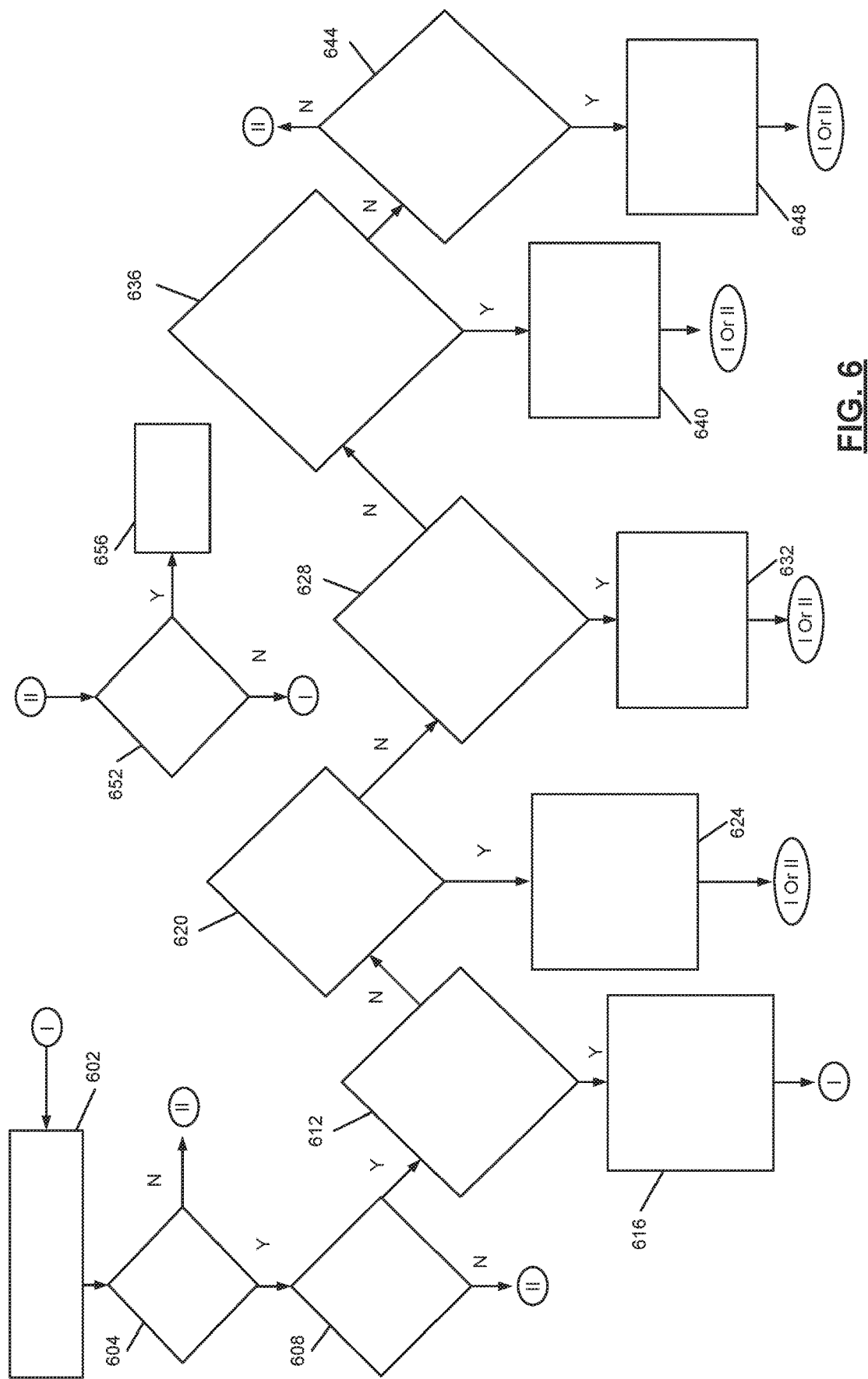

FIG. 6 is a flowchart depicting an example method of detecting routing of the seatbelt 212 of the vehicle seat 204 that for a present occupant, assesses specific shoulder belt routing during buckling. The method may be performed for each seat. Control begins at 602 where the method is activated. The method may be activated, for example, when the vehicle is turned on (e.g., an ignition system is turned on), when the doors have been shut, when the vehicle has been placed into a drive state, when a change in seat occupancy is detected, when a change in occupant position/posture is detected, when something that obscures the view of the seat belt is detected and/or when the state module 320 determines that a change (e.g., greater than a predetermined amount) in the payout 336 occurred.

At 604, the state module 320 determines whether the seatbelt (buckle) transitioned from unbuckled to buckled. For example, the state module 320 may determine whether the buckle signal 332 transitioned from the second state to the first state. If 604 is true (meaning the seat belt is just buckled), control continues with 608. If 604 is false (meaning the seat belt was not just buckled), control transfers to II of FIG. 6, which is discussed further below.

At 608, the state module 320 determines whether an occupant was present in the vehicle seat 204 at the time that the seatbelt 212 was buckled (e.g., when the buckle signal 332 transitioned from the second state to the first state). If 608 is true (meaning an occupant was present), control transfers to 612. If 608 is false (meaning an occupant was not present), control transfers to II of FIG. 6, which is discussed further below.

At 612, the state module 320 determines whether a trajectory of the shoulder portion of the seatbelt 212 is over the shoulder of the occupant when the seatbelt is pulled out prior to the buckling. If 612 is true (meaning that the seat belt is over the shoulder), control continues with 616. If 612 is false (meaning that the seat belt was not over the shoulder), control continues with 620. The state module 320 determines the trajectory of the shoulder portion of the seatbelt 212 based on the images 340 captured by the camera 224 before the buckling, for example, using the CNN or another suitable type of image processing.

At 616, the state module 320 sets the state 324 to a fifth state or the first state. The fifth state may indicate that the shoulder portion is properly routed over the shoulder of the occupant. The remediation module 344 may take one or more remedial actions when the state 324 is in the fifth state, such as not limiting the vehicle speed, allowing vehicle movement, and/or disabling the warning device 128. Control continues with I of FIG. 6.

At 620, the state module 320 determines whether the trajectory of the shoulder portion of the seatbelt 212 is under the arm of the occupant when the seatbelt is pulled out prior to the buckling. If 620 is true (meaning the shoulder belt is under the arm), control continues with 624. If 620 is false (meaning the shoulder belt is not under the arm), control continues with 628. At 624, the state module 320 sets the state 324 to a sixth state. The sixth state may indicate that the shoulder belt portion of the seatbelt is improperly routed under the arm after the buckling. The remediation module 344 may take one or more remedial actions when the state 324 is in the sixth state. For example, the remediation module 344 may prompt the warning module 348 to activate the warning device 128. Additionally or alternatively, the remediation module 344 may contact the remote location or prompt the acceleration control module 312 and/or the brake control module 316 to limit the vehicle speed to a predetermined maximum speed or to prevent movement of the vehicle. Control continues with I or II of FIG. 6 after 624.

At 628, the state module 320 determines whether the trajectory of the shoulder portion of the seatbelt 212 is outside of shoulder and on the outside of the arm of the occupant when the seatbelt is pulled out prior to the buckling. If 628 is true (meaning the shoulder belt portion is outside the shoulder on the side of the arm), control continues with 632. If 628 is false (meaning that the shoulder belt is not outside the shoulder on the side of the arm), control continues with 636. At 632, the state module 320 sets the state 324 to a seventh state. The seventh state may indicate that the seatbelt is improperly routed across/around the arm of the occupant after the buckling. The remediation module 344 may take one or more remedial actions when the state 324 is in the seventh state. For example, the remediation module 344 may prompt the warning module 348 to activate the warning device 128. Additionally or alternatively, the remediation module 344 may contact the remote location or prompt the acceleration control module 312 and/or the brake control module 316 to limit the vehicle speed to a predetermined maximum speed or to prevent movement of the vehicle. Control continues with I or II of FIG. 6 after 632.

At 636, the state module 320 determines whether the trajectory of the shoulder portion of the seatbelt 212 is on the wrong side of the head when the seatbelt is pulled out prior to the buckling. If 636 is true (meaning the shoulder belt is on the wrong side of the head), control continues with 640. If 636 is false (meaning the shoulder belt is not on the wrong side of the head), control continues with 644. At 640, the state module 320 sets the state 324 to an eighth state. The eighth state may indicate that the shoulder belt portion of the seatbelt is improperly routed on the wrong side of the head of the occupant after the buckling. The remediation module 344 may take one or more remedial actions when the state 324 is in the eighth state. For example, the remediation module 344 may prompt the warning module 348 to activate the warning device 128. Additionally or alternatively, the remediation module 344 may contact the remote location or prompt the acceleration control module 312 and/or the brake control module 316 to limit the vehicle speed to a predetermined maximum speed or to prevent movement of the vehicle. Control continues with I or II of FIG. 6 after 640.

At 644, the state module 320 determines whether the trajectory of the shoulder portion of the seatbelt 212 was over the head and later none of the shoulder belt was visible over the torso of the occupant. The state module 320 makes these determinations based on the images 340 captured by the camera 224. If 644 is true (meaning the trajectory of the shoulder belt was over the head and later none of the shoulder belt was visible over the torso of the occupant), control continues with 648. If 644 is false (meaning that this sequence did not occur), control continues with II of FIG. 6. At 648, the state module 320 sets the state 324 to a ninth state. The ninth state may indicate that the shoulder portion of the seatbelt 212 is improperly routed behind the occupant. The lap portion, however, may be located in front of and over the occupant. The remediation module 344 may take one or more remedial actions when the state 324 is in the ninth state. For example, the remediation module 344 may prompt the warning module 348 to activate the warning device 128. Additionally or alternatively, the remediation module 344 may contact the remote location or prompt the acceleration control module 312 and/or the brake control module 316 to limit the vehicle speed to a predetermined maximum speed or to prevent movement of the vehicle. Control continues with I or II of FIG. 6 after 648.

II of FIG. 6 continues with 652. At 652, the state module 320 determines whether to deactivate the method. For example, the state module 320 may determine whether the vehicle has been turned off or a hibernation mode has been entered at 652. The following are some examples where a hibernation mode can be invoked: a) if the seat belt payout as measured by a payout sensor has not varied beyond a predetermined amount for a predetermined period of time, b) the seat belt routing as measured by the camera 224 has not varied beyond a predetermined amount for a predetermined period of time, c) a predetermined amount of time has passed since the vehicle was placed in drive state, d) the seat belt is not buckled, and e) an occupant has not been detected. If 652 is true (meaning that the vehicle has been turned off or a hibernation mode has occurred), control may end or proceed with another method (e.g., the example of FIG. 7) at 656. If 652 is false (meaning that the vehicle has not been turned off and there is no active hibernation mode), control may return to I of FIG. 6.

Figure 7:
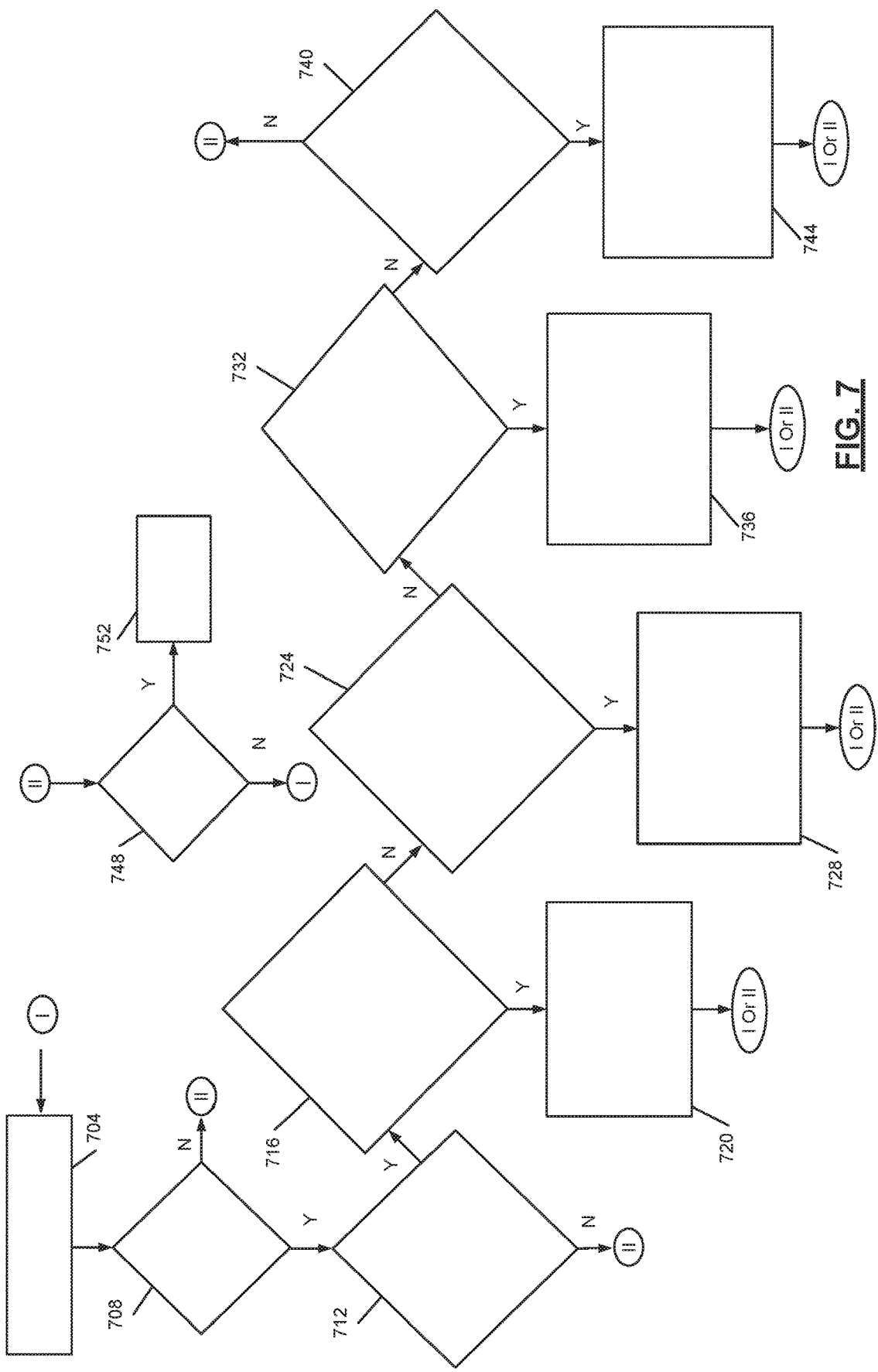

FIG. 7 is a flowchart depicting an example method of detecting routing of the seatbelt 212 of the vehicle seat 204 that assesses if a shoulder belt routed over the shoulder after buckling has been moved to a different routed location. The method may be performed for each seat. Control begins at 704 where the method is activated. The method may be activated, for example, when the vehicle is turned on (e.g., an ignition system is turned on), when a change in seat occupancy is detected, when a change in occupant position/posture is detected, when something that obscures the view of the seat belt is detected and/or when the state module 320 determines that a change (e.g., greater than a predetermined amount) in the payout 336 occurred. The method may also be activated at other times such as when the doors are closed or when the vehicle is placed into a drive state.

At 708, the state module 320 determines whether the seatbelt (buckle) transitioned from unbuckled to buckled. For example, the state module 320 may determine whether the buckle signal 332 transitioned from the second state to the first state. If 708 is true (meaning the seat belt is just buckled), control continues with 712. If 708 is false (meaning the seat belt was not just buckled), control transfers to II of FIG. 7, which is discussed further below.

At 712, the state module 320 determines whether, during the buckling (e.g., within a predetermined period before the buckling), an occupant was present in the seat and whether the shoulder portion of the seatbelt 212 was over the shoulder of the occupant. The state module 320 may make these determinations based on images from the camera 224 from before the buckling. If 712 is true (meaning the occupant was present and the shoulder belt was over the shoulder), control continues with 716. If 712 is false (meaning either the occupant was not present or the shoulder belt was not over the shoulder), control transfers to II of FIG. 7, which is discussed further below.

At 716, the state module 320 determines whether the shoulder portion of the seatbelt 212 moved from over the shoulder in a first image taken by the camera 224 to across the arm in a second image taken by the camera 224 after the first image to under the arm in a third image taken after the second image by the camera 224. If 716 is true (meaning that the shoulder belt moved to an under the arm location), control continues with 720. If 716 is false (meaning that the shoulder belt did not move to an under the arm location), control continues with 724. At 720, the state module 320 sets the state 324 to the sixth state (indicating that the shoulder portion is located under the arm). The remediation module 344 may take one or more remedial actions when the state 324 is in the sixth state. For example, the remediation module 344 may prompt the warning module 348 to activate the warning device 128. Additionally or alternatively, the remediation module 344 may contact the remote location or prompt the acceleration control module 312 and/or the brake control module 316 to limit the vehicle speed to a predetermined maximum speed or to prevent movement of the vehicle. Control continues with I or II of FIG. 7 after 720.

At 724, the state module 320 determines whether the shoulder portion of the seatbelt 212 moved from over the shoulder in a first image taken by the camera 224 to over the head of the occupant in a second image taken by the camera 224 after the first image to on the wrong side of the head (but on the torso of the occupant) in a third image taken after the second image by the camera 224. If 724 is true (meaning the shoulder belt is on the wrong side of the head), control continues with 728. If 724 is false (meaning the shoulder belt is not on the wrong side of the head), control continues with 732. At 728, the state module 320 sets the state 324 to the eighth state (indicating that the shoulder portion is located on the wrong side of the head). The remediation module 344 may take one or more remedial actions when the state 324 is in the eighth state. For example, the remediation module 344 may prompt the warning module 348 to activate the warning device 128. Additionally or alternatively, the remediation module 344 may contact the remote location or prompt the acceleration control module 312 and/or the brake control module 316 to limit the vehicle speed to a predetermined maximum speed or to prevent movement of the vehicle. Control continues with I or II of FIG. 7 after 728.

At 732, the state module 320 determines whether the shoulder portion of the seatbelt 212 moved from over the shoulder in a first image taken by the camera 224 to over the head of the occupant in a second image taken by the camera 224 after the first image to not being visible on the torso of the occupant in a third image taken after the second image by the camera 224. If 732 is true (meaning the shoulder belt is behind the torso), control continues with 736. If 732 is false (meaning the shoulder belt is not behind the torso), control continues with 740. At 736, the state module 320 sets the state 324 to the ninth state (indicating that the shoulder portion is located behind the occupant). The remediation module 344 may take one or more remedial actions when the state 324 is in the ninth state. For example, the remediation module 344 may prompt the warning module 348 to activate the warning device 128. Additionally or alternatively, the remediation module 344 may contact the remote location or prompt the acceleration control module 312 and/or the brake control module 316 to limit the vehicle speed to a predetermined maximum speed or to prevent movement of the vehicle. Control continues with I or II of FIG. 7 after 736.

At 740, the state module 320 determines whether the shoulder portion of the seatbelt 212 moved from over the shoulder in a first image taken by the camera 224 to across the arm in a second image taken by the camera 224 after the first image and remained across the arm in a third image taken after the second image by the camera 224. If 740 is true (meaning the shoulder belt is across the arm), control continues with 744. If 740 is false (meaning the shoulder belt is not across the arm), control continues with II of FIG. 7. At 744, the state module 320 sets the state 324 to the seventh state (indicating that the shoulder portion is located across the arm). The remediation module 344 may take one or more remedial actions when the state 324 is in the seventh state. For example, the remediation module 344 may prompt the warning module 348 to activate the warning device 128. Additionally or alternatively, the remediation module 344 may contact the remote location or prompt the acceleration control module 312 and/or the brake control module 316 to limit the vehicle speed to a predetermined maximum speed or to prevent movement of the vehicle. Control continues with I or II of FIG. 7 after 744.

II of FIG. 7 continues with 748. At 748, the state module 320 determines whether to deactivate the method. For example, the state module 320 may determine whether the vehicle has been turned off or a hibernation mode has been entered at 748. The following are some examples where a hibernation mode can be invoked: a) if the seat belt payout as measured by a payout sensor has not varied beyond a predetermined amount for a predetermined period of time, b) the seat belt routing as measured by the camera 224 has not varied beyond a predetermined amount for a predetermined period of time, c) a predetermined amount of time has passed since the vehicle was placed in drive state, d) the seat belt is not buckled, and e) an occupant has not been detected. If 748 is true (meaning that the vehicle has been turned off or a hibernation mode has occurred), control may end or proceed with another method (e.g., the example of FIG. 8) at 752. If 748 is false (meaning that the vehicle has not been turned off and there is no active hibernation mode), control may return to I of FIG. 7.

FIG. 8 is a flowchart depicting an example method of detecting routing of the seatbelt 212 of the vehicle seat 204 when the shoulder belt portion of the seat belt becomes more obscured from view. The method may be performed for each seat. Control begins at 804 where the method is activated. The method may be activated, for example, when the vehicle is turned on (e.g., an ignition system is turned on), when a change in seat occupancy is detected, when a change in occupant position/posture is detected, when something that obscures the view of the seat belt is detected and/or when the state module 320 determines that a change (e.g., greater than a predetermined amount) in the payout 336 occurred. The method may also be activated at other times such as when the doors are closed or when the vehicle is placed into a drive state.

At 808, the state module 320 determines whether the seatbelt (buckle) transitioned from unbuckled to buckled. For example, the state module 320 may determine whether the buckle signal 332 transitioned from the second state to the first state. If 808 is true (meaning the seat belt is just buckled), control continues with 812. If 808 is false (meaning the seat belt was not just buckled), control transfers to II of FIG. 8, which is discussed further below.

At 812, the state module 320 stores the current state 324. The current state 324 is indicative of the current routing configuration of the seatbelt 212, such as determined according to the examples of FIGS. 5, 6, and 7. At 816, the state module 320 determines whether the shoulder belt portion of the seatbelt 212 is more obscured over time in images captured by the camera 224. For example, the state module 320 may determine whether the shoulder belt portion of the seatbelt 212 is more obscured in a second image captured by the camera 224 than in a first image captured by the camera 224 before the second image. If 816 is true (meaning the shoulder belt is more obscured), control continues with 820. If 816 is false (meaning the shoulder belt is not more obscured), control continues with II of FIG. 8, which is discussed further below.

At 820, the state module 320 determines whether the visible portion of the shoulder portion of the seatbelt 212 changed position by more than a predetermined amount from either a first image captured using the camera 22 or a second image captured using the camera 224 to a third image captured using the camera 224 after the second image. The state module 320 may determine a first location of the seatbelt 212 visible in the first or second images and a second location of the seatbelt 212 visible in the third image and determine a change in the visible portion based on a difference between the second location and the first location. If 820 is true (meaning that the shoulder belt location changed beyond a threshold), control continues with 828. If 820 is false (meaning the shoulder belt location did not change beyond a threshold), the state module 320 maintains the current state 324 (the current routing classification) at 824, and control continues with II of FIG. 8.

At 828, the state module 320 determines whether a new routing classification can be determined from the visible portion of the shoulder portion of the seatbelt 212 in the most recent image from the camera 224. Examples of the classifications are described, for example, in the examples of FIGS. 5, 6, and 7. If 828 is false (meaning that a new classification cannot be determined), the state module 320 may set the state 324 to an unknown state (indicating that the current routing classification is unknown) at 832. The remediation module 344 may then take one or more remedial actions when the state 324 is in the unknown state. For example, the remediation module 344 may prompt the warning module 348 to activate the warning device 128. Additionally or alternatively, the remediation module 344 may contact the remote location or prompt the acceleration control module 312 and/or the brake control module 316 to limit the vehicle speed to a predetermined maximum speed or to prevent movement of the vehicle. Control may continue with I or II of FIG. 8. If 828 is true (meaning that enough of the shoulder belt can be seen to determine a new classification, such as per the examples of FIGS. 5, 6, and 7), the state module 320 determines and updates the state 324 based on the most recent image from the camera 224 at 836. Control continues with 840 of FIG. 8.

II of FIG. 8 continues with 844. At 844, the state module 320 determines whether to deactivate the method. For example, the state module 320 may determine whether the vehicle has been turned off or a hibernation mode has been entered at 844. The following are some examples where a hibernation mode can be invoked: a) if the seat belt payout as measured by a payout sensor has not varied beyond a predetermined amount for a predetermined period of time, b) the seat belt routing as measured by the camera 224 has not varied beyond a predetermined amount for a certain period of time, c) a predetermined amount of time has passed since the vehicle was placed in drive state, d) the seat belt is not buckled, and e) an occupant has not been detected. If 844 is true (meaning that the vehicle has been turned off or a hibernation mode has occurred), control may end or proceed with another method (e.g., the example of FIG. 8) at 848. If 844 is false (meaning that the vehicle has not been turned off and there is no active hibernation mode), control may return to I of FIG. 8.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for detecting seatbelt routing, comprising:
a state module configured to, based on a series of images over a period of time from a camera of a vehicle facing a seat, determine and output a routing state of a seatbelt of the seat,
wherein the state module is configured to set the routing state of the seatbelt to a state indicative of the seatbelt being routed under an arm of an occupant of the seat in response to a determination that:
a shoulder portion of the seatbelt was located on a shoulder of the occupant in a first image captured at a first time by the camera;
the shoulder portion was located across the arm of the occupant in a second image captured at a second time by the camera, wherein the second time is after the first time; and
the shoulder portion was located under the arm of the occupant in a third image captured at a third time by the camera, wherein the third time is after the second time; and
a remediation module configured to, based on the routing state of the seatbelt of the seat, selectively perform at least one remedial action.

2. The system of claim 1 wherein the state module is configured to set the routing state of the seatbelt to a state indicative of proper routing of the seatbelt after seat belt buckling in response to a determination that, based on at least one of the images from the camera captured within a predetermined period before buckling of the seatbelt, the shoulder portion of the seatbelt was located in front of the occupant while the occupant was sitting on the seat.

3. The system of claim 1 wherein the state module is configured to set the routing state of the seatbelt to a state indicative of a lap portion of the seatbelt being improperly routed behind the occupant of the seat in response to a determination that, based on at least one of the images from the camera:
the occupant entered the seat after buckling of the seatbelt; and
the shoulder portion of the seatbelt transitions to being located in front of the occupant after the occupant entered the seat.

4. The system of claim 1 wherein the state module is configured to set the routing state of the seatbelt to a state indicative of both a lap portion and the shoulder portion of the seatbelt being improperly routed behind the occupant of the seat in response to a determination that, based on at least one of the images from the camera:
the occupant entered the seat after buckling of the seatbelt; and
the shoulder portion of the seatbelt is not located in front of the occupant after the occupant entered the seat.

5. The system of claim 1 wherein the state module is configured to set the routing state of the seatbelt to a state indicative of the seat being not occupied by the occupant in response to a determination that, based on at least one of the images from the camera:
no occupant was present in the seat during buckling of the seatbelt and no occupant entered the seat after buckling of the seatbelt.

6. The system of claim 1 wherein the state module is configured to set the routing state of the seatbelt to a state indicative of a lap portion of the seatbelt being improperly routed behind the occupant of the seat in response to a determination that, based on at least one of the images from the camera:
the occupant entered the seat during buckling of the seatbelt; and
the shoulder portion of the seatbelt transitions from being behind the occupant during buckling to being located in front of the occupant after buckling.

7. The system of claim 1 wherein the state module is configured to set the routing state of the seatbelt to a state indicative of the seatbelt being routed under the arm of the occupant of the seat in response to a determination that, based on at least one of the images from the camera:
the occupant was seated on the seat during buckling of the seatbelt; and
a trajectory of the seatbelt within a predetermined period before the buckling was under the arm of the occupant.

8. The system of claim 1 wherein the state module is configured to set the routing state of the seatbelt to a state indicative of the seatbelt being routed across the arm of the occupant of the seat in response to a determination that, based on at least one of the images from the camera:
the occupant was seated on the seat during buckling of the seatbelt; and
a trajectory of the seatbelt within a predetermined period before the buckling was across the arm of the occupant.

9. The system of claim 1 wherein the state module is configured to set the routing state of the seatbelt to a state indicative of the seatbelt being routed on a wrong side of a head of the occupant of the seat in response to a determination that, based on at least one of the images from the camera:
the occupant was seated on the seat during buckling of the seatbelt; and
a trajectory of the seatbelt within a predetermined period before the buckling was on a side of the head the occupant closest to a buckle of the seat.

10. The system of claim 1 wherein the state module is configured to set the routing state of the seatbelt to a state indicative of the shoulder portion of the seatbelt being routed behind the occupant of the seat in response to a determination that, based on at least one of the images from the camera:
the occupant was seated on the seat during buckling of the seatbelt; and
the shoulder portion of the seatbelt is not visible on a torso of the occupant after the buckling.

11. The system of claim 1 wherein the state module is configured to set the routing state of the seatbelt to a state indicative of the seatbelt being routed on a wrong side of a head of the occupant of the seat in response to a determination that:
the shoulder portion of the seatbelt was located on a shoulder of the occupant in a fourth image captured at a fourth time by the camera;
the shoulder portion was located over the head of the occupant in a fifth image captured at a fifth time by the camera, wherein the fifth time is after the fourth time; and
the shoulder portion was located on the wrong side of the head of the occupant and across a torso of the occupant in a sixth image captured at a sixth time by the camera, wherein the sixth time is after the fifth time.

12. The system of claim 1 wherein the state module is configured to set the routing state of the seatbelt to a state indicative of the shoulder portion of the seatbelt being routed behind the occupant of the seat in response to a determination that:

the shoulder portion of the seatbelt was located on a shoulder of the occupant in a fourth image captured at a fourth time by the camera;

the shoulder portion was located over a head of the occupant in a fifth image captured at a fifth time by the camera, wherein the fifth time is after the fourth time; and the shoulder portion was not located on a torso of the occupant in a sixth image captured at a sixth time by the camera, wherein the sixth time is after the fifth time.

13. The system of claim 1 wherein the state module is configured to set the routing state of the seatbelt to a state indicative of the seatbelt being routed across the arm of the occupant of the seat in response to a determination that:

the shoulder portion of the seatbelt was located on a shoulder of the occupant in a fourth image captured at a fourth time by the camera; and the shoulder portion was located across the arm of the occupant in a fifth image captured at a fifth time by the camera, wherein the fifth time is after the fourth time.

14. The system of claim 1 wherein the state module is configured to maintain the routing state the seatbelt in response to a determination that:

a difference between (a) a first visible location of the shoulder portion of the seatbelt in a fourth or fifth image captured by the camera at a fourth or fifth time and (b) a second visible location of the shoulder portion of the seatbelt in a sixth image captured by the camera at a sixth time is less than a predetermined change value, wherein the sixth time is after the fifth time.

15. The system of claim 1 wherein the state module is configured to change the routing state the seatbelt in response to a determination that:

a difference between (a) a first visible location of the shoulder portion of the seatbelt in a fourth or fifth image captured by the camera at a fourth or fifth time and (b) a second visible location of the shoulder portion of the seatbelt in a sixth image captured by the camera at a sixth time is greater than a predetermined change value, wherein the sixth time is after the fifth time.

16. The system of claim 1 wherein the remediation module is configured to, based on the routing state of the seatbelt, selectively one of:

transmit a message to a remote location;

limit a speed of the vehicle to a predetermined maximum speed prevent movement of the vehicle; and slow the vehicle to a stop.

17. The system of claim 1 wherein the remediation module is configured to, based on the routing state of the seatbelt, activate at least one of:

a visual warning device;

an audible warning device; and a haptic warning device.

18. The system of claim 1 wherein the state module is configured to disable the determination and output of the routing state of the seatbelt in response to at least one of:

the vehicle being transitioned off; and a hibernation mode being entered.

19. A method for detecting seatbelt routing, comprising:

based on a series of images over a period of time from a camera of a vehicle facing a seat, determining a routing state of a seatbelt of the seat, the determining the routing state including setting the routing state of the seatbelt to a state indicative of the seatbelt being routed under an arm of an occupant of the seat in response to a determination that:

a shoulder portion of the seatbelt was located on a shoulder of the occupant in a first image captured at a first time by the camera;

the shoulder portion was located across the arm of the occupant in a second image captured at a second time by the camera, wherein the second time is after the first time; and the shoulder portion was located under the arm of the occupant in a third image captured at a third time by the camera, wherein the third time is after the second time; and based on the routing state of the seatbelt of the seat, selectively performing at least one remedial action.

* * * * *